US012769711B2

(12) United States Patent
Manchenahalli Shivashankar et al.

(10) Patent No.: US 12,769,711 B2
(45) Date of Patent: Oct. 20, 2026

(54) NEAR ZERO DOWNTIME MIGRATION

(71) Applicant: ServiceNow, Inc., Santa Clara, CA (US)

(72) Inventors: Pruthviraj Manchenahalli Shivashankar, San Diego, CA (US); Alexei Olkhovskii, Vista, CA (US); Szu-hsuan Lee, San Diego, CA (US); Venkata Kiran Kumar Koya, Poway, CA (US); Vincent Seguin, Rancho Santa Fe, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 19/088,141

(22) Filed: Mar. 24, 2025

(65) Prior Publication Data

US 2026/0288684 A1 Sep. 24, 2026

(51) Int. Cl.
*G06F 16/21* (2019.01)
*G06F 16/27* (2019.01)

(52) U.S. Cl.
CPC ............ *G06F 16/214* (2019.01); *G06F 16/27* (2019.01)

(58) Field of Classification Search
CPC ............................... G06F 16/214; G06F 16/27
See application file for complete search history.

(56) References Cited

U.S. PATENT DOCUMENTS

2012/0221603 A1* 8/2012 Kothule ................ G06F 16/256 707/783
2018/0025066 A1* 1/2018 Lui ......................... G06F 8/656 707/610

* cited by examiner

*Primary Examiner* — Tyler J Torgrimson
(74) *Attorney, Agent, or Firm* — Novak Druce Carroll LLP

(57) ABSTRACT

Embodiments of the subject technology relate to systems, methods, and computer-readable media for database switching. Specifically, a second database can be added as a standby candidate database to a node accessing a first database as a primary database. The data in the first database can be replicated in the second database. The first database can be assigned to a read-only mode. It can be verified that the data from the first database has been replicated in the second database. As follows, the second database can be switched from the standby candidate database to the primary database for the node while keeping the first database in the read-only mode in response to the verification.

20 Claims, 9 Drawing Sheets

NEAR ZERO DOWNTIME MIGRATION

BACKGROUND

1. Technical Field

The present disclosure generally relates to node management, and more specifically to controlling database switchover for nodes.

2. Introduction

Computing environments can comprise nodes. Such nodes can point to and access a primary database when operating in the computing environment. Further, nodes can switch databases for operating in the computing environment.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form to avoid obscuring the concepts of the subject technology.

A node in a computing environment can point to and access a primary database when operating in the computing environment. However, problems can arise when a switchover occurs and the node accesses a different database to continue operating in the computing environment. Specifically, when the node needs to switch databases, the node can be restarted to reinitialize the database connections to the new database. This is problematic, as nodes can take varying amounts of time, e.g. one to twenty minutes, to restart leading to large amounts of node downtime and node downtime variability in the computing environment. In particular, when Glide® application nodes need to point to a different database engine, the nodes can be restarted to reinitialize the database connections before proceeding, thereby leading to node downtime.

The disclosed technology addresses the foregoing by facilitating switching of a node to a new database without restarting the node. Specifically, an intended new primary database can be added as a standby database to a node. While the node is still connected to its current primary database, data can be replicated from the current primary database to the new database. As the data is migrated over, the current primary database can be assigned to a read-only mode. Further, the data migration to the new database can be verified. After the data migration is verified, a switchover can occur during which the new primary database can be made the primary database of the node without restarting the node. Specifically, an intended primary database value associated with the node can be changed from a uniform resource locator (URL) of the current primary database to a URL of the new primary database without restarting the node.

Figure 1A:
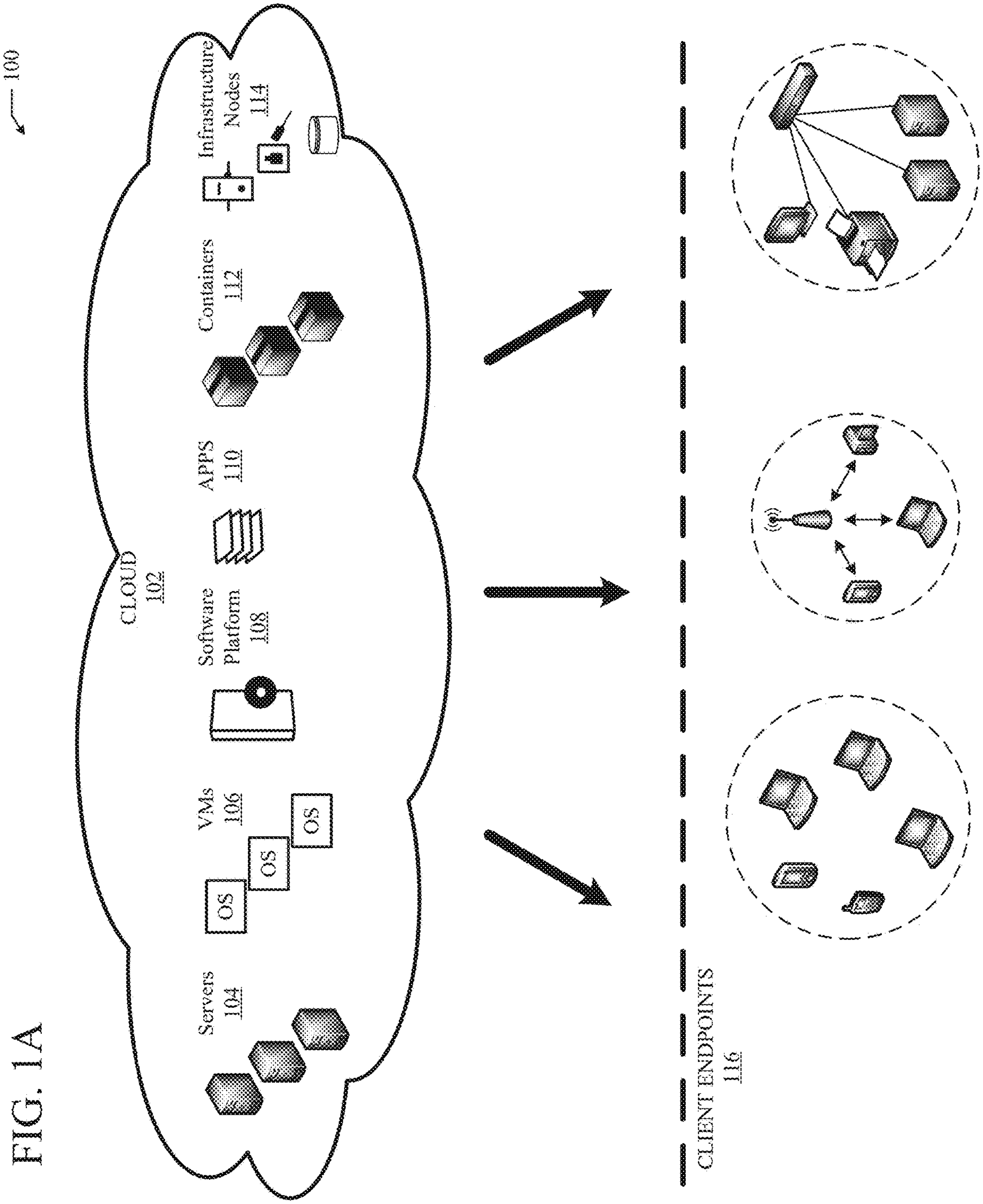
FIG. 1A illustrates a diagram of an example cloud computing architecture, according to some examples of the present disclosure.

FIG. 1A illustrates a diagram of an example cloud computing architecture 100. The architecture can include a cloud 102. The cloud 102 can include one or more private clouds, public clouds, and/or hybrid clouds. Moreover, the cloud 102 can include cloud elements 104-114. The cloud elements 104-114 can include, for example, servers 104, virtual machines (VMs) 106, one or more software platforms 108, applications or services 110, software containers 112, and infrastructure nodes 114. The infrastructure nodes 114 can include various types of nodes, such as compute nodes, storage nodes, network nodes, management systems, etc.

The cloud 102 can provide various cloud computing services via the cloud elements 104-114, such as software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The client endpoints 116 can connect with the cloud 102 to obtain one or more specific services from the cloud 102. The client endpoints 116 can communicate with elements 104-114 via one or more public networks (e.g., Internet), private networks, and/or hybrid networks (e.g., virtual private network). The client endpoints 116 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IOT) device, a camera, a network printer, or any smart or connected object (e.g., smart home, smart building, smart retail, smart glasses, etc.), and so forth.

In some cases, one or more embodiments, components, devices, nodes, systems, instances, and/or portions of the example cloud 102 can be implemented by and/or in a cloud network or datacenter. For example, any portion (or all) of the network 118, any of the content servers 120 (or all), and/or any of the system servers 126 (or all) can be implemented by and/or in a cloud network or datacenter. An example network architecture that can be used to implement any such network or datacenter (or any portion thereof), is shown in FIG. 1B and further described below.

Figure 1B:
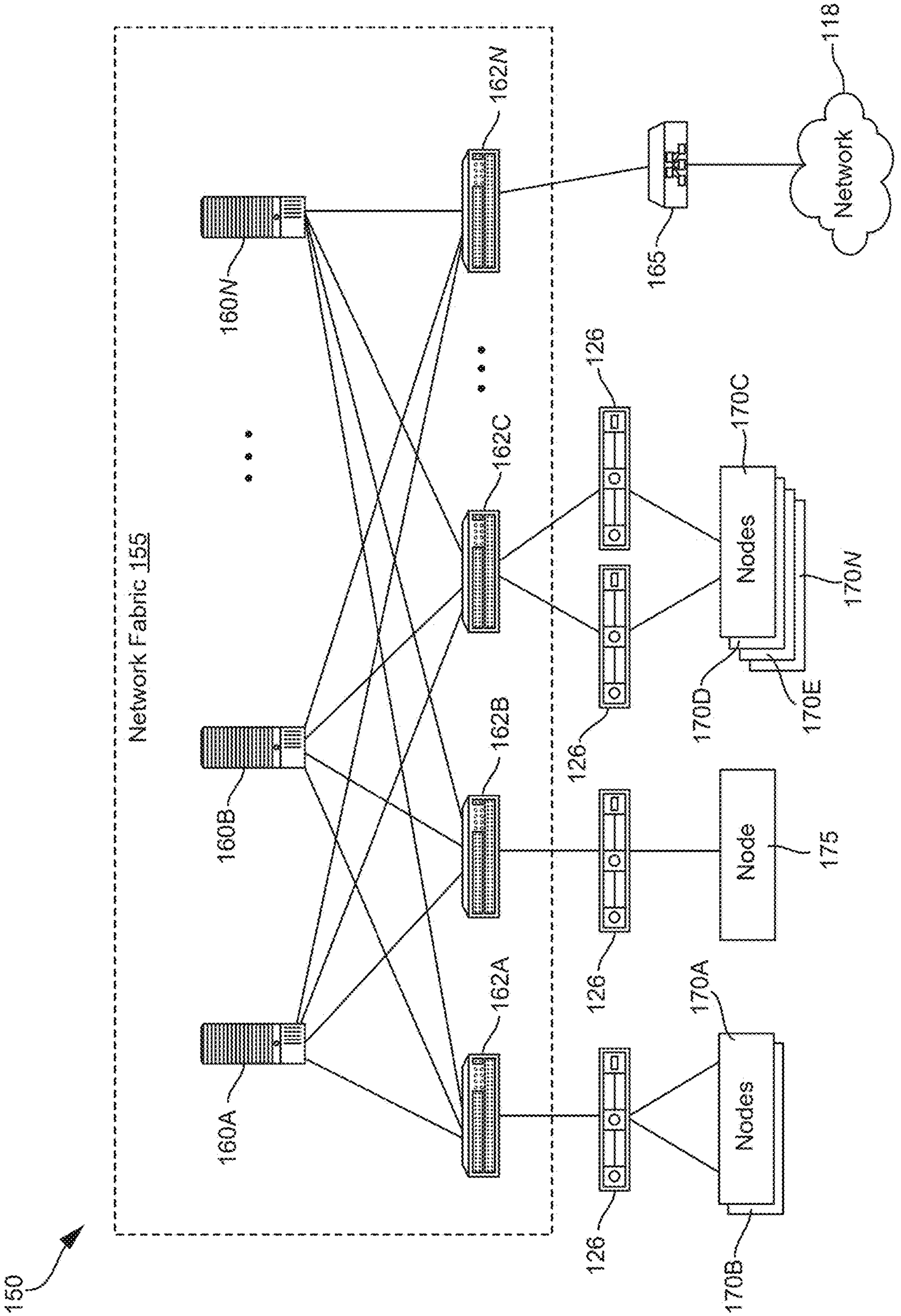
FIG. 1B is a block diagram illustrating an example network architecture that can be used to implement one or more embodiments, components, devices, nodes, systems, instances, and/or portions of the example cloud computing architecture, according to some examples of the present disclosure.

FIG. 1B is a block diagram illustrating an example network architecture 150 that can be used to implement one or more embodiments, components, devices, nodes, systems, instances, and/or portions of the example cloud computing architecture 100, according to some examples of the present disclosure. The example network architecture 150 in FIG. 1B can represent, implement, deploy, host, support, include and/or provide the infrastructure for (or a portion of the infrastructure for) a datacenter (e.g., a cloud datacenter, an on-premises datacenter, a hybrid datacenter including private and public datacenters or datacenter portions, etc.), a network infrastructure, and/or any network environment (or portion thereof) such as, for example and without limitation, a cloud network/environment, a campus network/environment, an enterprise network/environment, an on-premises network/environment, a private network/environment, a public network/environment, a hybrid network/environment (e.g., a network/environment including both private and public networks/environments or portions thereof), and/or the like.

In some examples, the example network architecture 150 can host, implement, deploy, provide (e.g., provide the infrastructure for or a portion of the infrastructure for), support, and/or run/execute one or more applications, virtual machines (VMs), software containers, software tools, software functions, software algorithms, software models (e.g., artificial intelligence and machine learning models, software models implementing one or more classical algorithms, etc.), software applications, software packages, domains, databases, networks, services, workloads, service chains, functions, controllers, virtual network functions (VNFs), servers, drivers, hardware and/or software resources, software and/or hardware devices, software and/or hardware nodes, networking elements, serverless environments, serverless functions, cloud services and/or applications (e.g., software-as-a-service, function-as-a-service, infrastructure-as-a-service, platform-as-a-service, cloud applications, and/or any other cloud services and/or applications), execution environments, storage systems, processing/compute systems, memory systems, software and/or network sites, software policies, virtual/logical networks, overlay networks, software-defined networks (SDNs), interfaces, and/or any other code, component, element, application, service, etc.

Figure 3:
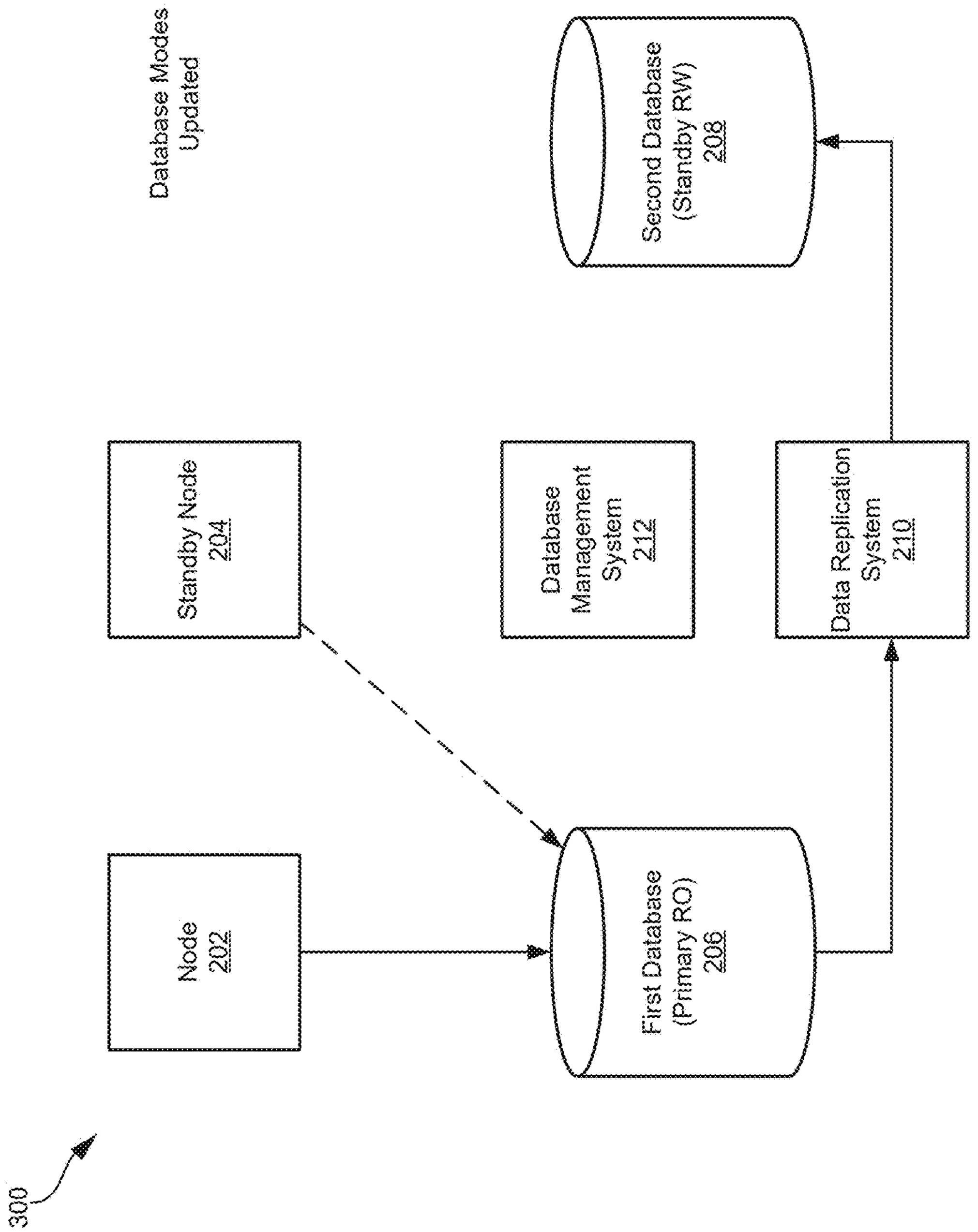
FIG. 3 illustrates a schematic diagram of the environment in which the first database 206 is switched to a read-only mode while still serving as the primary database, according to some examples of the present disclosure.

For example, the network architecture 150 can include, represent, implement, support, run, host, and/or provide the infrastructure for (or a portion of the infrastructure for) a datacenter, network (e.g., a cloud or cloud network, an on-premises network, a private network, a public network, a hybrid network, etc.), network infrastructure, and/or network environment used to host, implement, support, deploy, provide, and/or run quality control workloads/nodes, such as the worker nodes and the master node shown in FIG. 3 (and further described below). In such examples, the master node and each of the worker nodes can implement, include, represent, support, run, host, and/or provide one or more software applications/services, software systems, software packages, software modules, software units, software tools, interfaces, software/application code, functions, virtual environments, virtual applications, execution environments, virtualization elements (e.g., operating system-level virtualization elements, application-level virtualization elements, etc.), platforms, and/or any other components. In some cases, the master node and/or one or more of the worker nodes (or all) can each host and run one or more software containers, VMs, VNFs, applications (e.g., container applications, VM applications, and/or any other software applications), operating systems (OSs), functions, tools, and/or any other execution environment, code, tool, component, element, and/or package.

As shown in FIG. 1B, the network architecture 150 can include a network fabric 155. The network fabric 155 can include and/or represent the physical layer (e.g., underlay) and/or infrastructure of the network architecture 150. In some cases, the network fabric 155 can represent a data center(s) of one or more networks such as, for example, one or more cloud networks. The network fabric 155 can include network devices 160A-N (collectively referred to as "network devices 160" hereinafter) and network devices 162A-N (collectively referred to as "network devices 162" hereinafter), which are interconnected to route, relay, forward, and/or switch traffic in the network fabric 155. In some examples, the network devices 160 and the network devices 162 can include, implement, represent, and/or operate as switches (e.g., Layer 2 and/or Layer 3 switches, aggregation switches, ingress and/or egress switches, top-of-rack (ToR) switches, core switches, spine switches, leaf switches, etc.), routers, hubs, bridges, gateways, provider edge devices, firewalls, network controllers, and/or any other type of networking devices. In FIG. 1B, the network fabric 155 includes or implements a spine-leaf topology. In such examples, the network devices 160 can represent spine nodes (e.g., spine switches or routers) and the network devices 162 can represent leaf nodes (e.g., leaf switches or routers). In other examples, the network fabric 155 can alternatively or additionally include or implement any other network topology.

The network devices 160 are interconnected with the network devices 162, and the network devices 162 can connect the network 118, the system servers 126 (e.g., including QC system(s) 130 and configuration system(s) 132), the network device 165, the nodes 170, and/or the node 175 with any portion of the network fabric 155 (e.g., including each other), the media device(s) 106, the content servers 120, an external network(s), a network overlay(s), a logical network(s), a network portion(s) or branch/branches, an external device(s), a service chain(s), a data center(s), a cloud network(s), and/or any other network(s) and/or compute/network element(s). In some cases, the network fabric 155 can include, host, and/or implement a network overlay (s) or logical network(s) that includes or implements one or more application services, servers, VMs, software containers, virtual resources (e.g., storage, memory, processors, network interfaces, virtual tools, execution environments, etc.), workloads, functions, virtual networks, hardware and/or software resources, and/or any other element(s).

Network connectivity in the network fabric 155 can flow from the network devices 160 to the network devices 162, and vice versa. The network devices 162 can route, switch, relay, forward, and/or bridge network traffic to and from other portions of the network fabric 155, other networks, e.g. network 118, various network elements, the network device 165, the nodes 170, the node 175, external client devices (e.g., clients devices external to the network fabric 155), data centers, clouds, tunnels, software-defined networks (SDNs) and/or SDN branches, on-premises networks, cloud tenants, cloud customers, applications, and/or any other network element. Thus, the network devices 162 can connect networks and network elements of the network fabric 155 with each other and with other networks and network elements.

In FIG. 1B, the system servers 126 can include or represent computer servers. Each of the system servers 126 can host, include, implement, and/or run one or more applications, functions, services, VMs, software containers, service chains, workloads, AI/ML models, algorithms, resources, cloud appliances, and/or any other software. In some cases, the system servers 126 connected to the network devices 162 can encapsulate and decapsulate packets to and from the network devices 162. For example, the system servers 126 can include, host, implement and/or operate one or more virtual routers, switches, gateways, endpoints, and/or network devices for tunneling packets between an overlay or logical layer hosted by, or connected to, the system servers 126 and an underlay layer represented by or included in the network fabric 155.

As shown in FIG. 1B, the system servers 126 can host, include, run, operate, and/or implement the nodes 170 and the node 175. In some examples, the nodes 170 and the node 175 can represent cloud instances. For example, in some cases, the nodes 170 and the node 175 can each represent a virtual server and/or environment (e.g., a VM, a software container, etc.) that uses compute, memory, storage, and/or networking resources on the cloud (e.g., network architecture 150) for respective workloads. In some embodiments, the nodes 170 and/or the node 175 can perform parallel computing using, for example, multithreading. Each of the nodes 170 and/or the node 175 can include, host, implement, run, operate, and/or represent one or more server applications, software containers, VMs, software, services, AI/ML models, algorithms, cloud appliances, software functions, service chains, workloads, server-side functions, processing resources, computers, and/or any other software and/or hardware component.

For example, in some cases, each of the nodes 170 and/or the node 175 can represent a node instance that includes, implements, hosts, and/or runs a software container(s). The software container associated with a node can provide, run, deploy, include, operate, represent, and/or implement an execution environment(s), a workload(s), an application(s), software, an AI/ML model(s), an algorithm(s), a driver(s), a computer service(s), a software model(s) and/or algorithm(s), a function(s), a software library/libraries, a software tool(s), a software/cloud appliance(s), a software component(s), and/or any other computing element(s). In some cases, the nodes 170 and the node 175 can represent cloud node instances running respective computing environments, such as software containers or VMs. Each VM can include software, services, drivers, applications, libraries, functions, virtualized resources (e.g., processors, memory, storage, network interfaces, etc.), and/or workloads installed, implemented, included, and/or running/executed on a guest operating system (OS) associated with the VM.

The network architecture 150 can deploy, run, implement, host, and/or support various resources (e.g., hosts, applications, services, functions, VMs, software containers, workloads, cloud appliances, service chains, hardware and/or software resources, AI/ML models, algorithms, application platforms, operating systems, etc.) using the system servers 126, the network fabric 155, the network devices 160, the network devices 162, the network device 165, the nodes 170, the node 175, and the network 118.

In some cases, the network architecture 150 can implement and/or can be part of one or more cloud networks and can provide one or more cloud computing services such as, for example and without limitation, cloud storage, serverless computing, software-as-a-service (SaaS) (e.g., streaming services, content delivery services, video services, Internet content services, application services, conferencing services, etc.), infrastructure-as-a-service (IaaS), platform-as-a-service (PaaS) (e.g., web services, streaming services, content delivery services, content library services, conferencing services, video services, Internet content services, sharing and/or collaboration services, etc.), function-as-a-service (FaaS), and/or any other types of services such as desktop-as-a-service (DaaS), information technology management-as-a-service (ITaaS), managed software-as-a-service (MSaaS), mobile backend-as-a-service (MBaaS), etc.

The network architecture 150 described above illustrates a non-limiting example network architecture provided herein for explanation purposes. It should be noted that other network architectures can be implemented in other examples and are also contemplated herein. One of ordinary skill in the relevant art(s) will recognize in view of the disclosure that other network architectures can be used to implement one or more of the concepts, systems, techniques, devices, software, applications, methods, embodiments, elements, examples, and/or components disclosed herein.

Various embodiments of the subject technology can be implemented through the cloud computing architecture 100 shown in FIG. 1A and the network architecture 150 shown in FIG. 1B.

Figure 2:
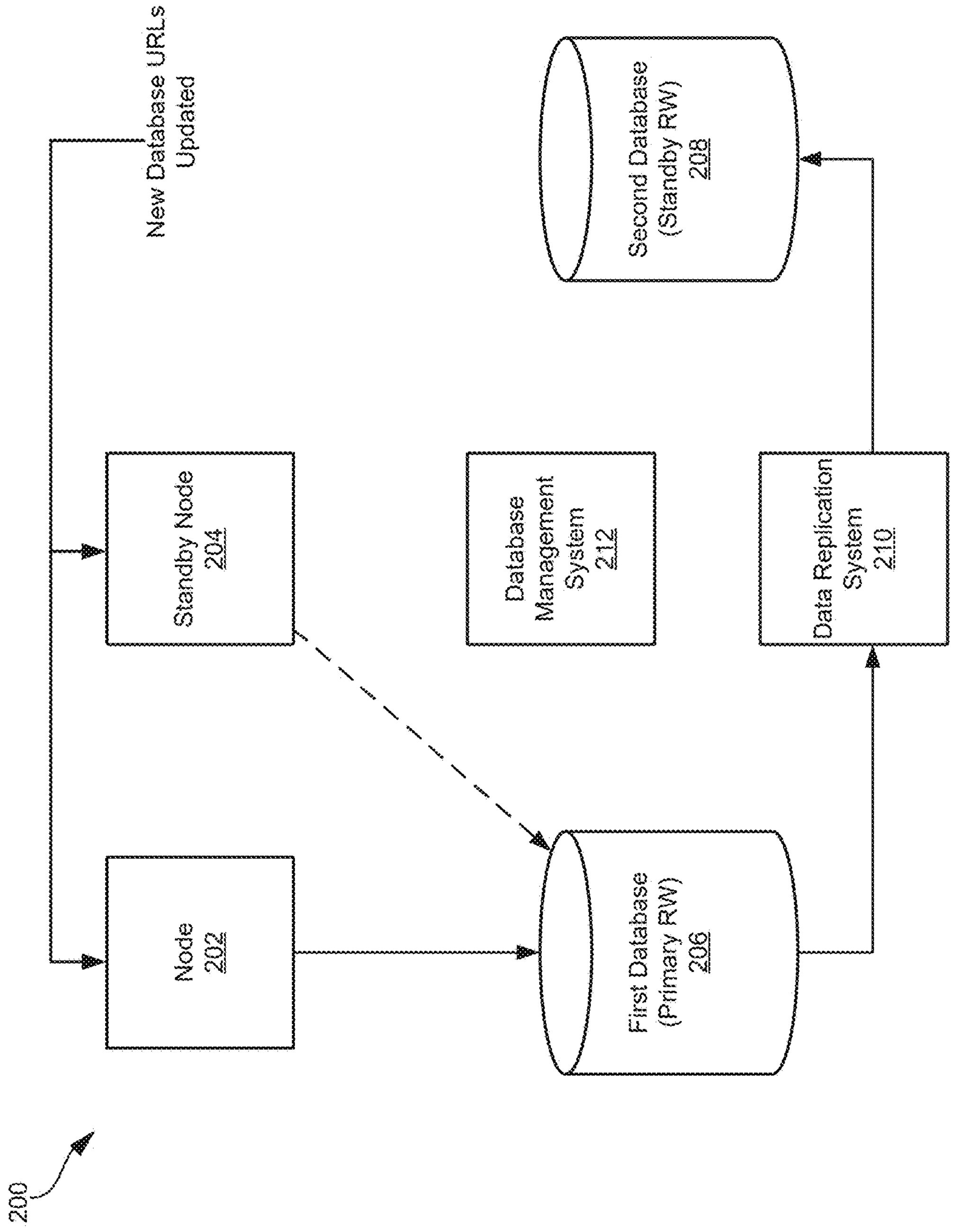
FIG. 2 illustrates a schematic diagram of an environment in which a second database is introduced as a standby database to a node, according to some examples of the present disclosure.

FIG. 2 illustrates a schematic diagram of an environment 200 in which a second database is introduced as a standby database to a node, according to some examples of the present disclosure. The environment 200 comprises a node 202 and a standby node 204 (collectively referred to as "nodes 202 and 204"). The nodes 202 and 204 can function according to applicable nodes in executing instructions in a computing environment. Specifically, the nodes 202 and 204 can form part of node clusters operating in the computing environment. The nodes 202 and 204 can be instances of an application running on a computer. For example, the nodes 202 and 204 can form a cluster of nodes forming an application running in the environment 200. The nodes 202 and 204 can be created through a no-code application builder that allows users to create functional applications without writing any code. For example, the nodes 202 and 204 can be Glide® nodes.

Further, the environment 200 comprises a first database 206. In the environment 200 shown in FIG. 2, the nodes 202 and 204 can point to the first database 206 which serves as a primary database for the nodes 202 and 204. Specifically, the first database 206 can be in a read-write configuration. Accordingly, the node 202 can read from and write to the first database 206. More specifically, in-flight transactions of both read and write operations can be carried out between the node 202 and the first database 206.

The environment 200 also comprises a second database 208, a data replication system 210, and a database management system 212. Both the first database 206 and the second database 208 can be an applicable type of database, e.g. relational, object-oriented, NoSQL, and time-series database. The second database 208 can be associated with a different database engine, e.g. relational database management system (RDBMS) engine than the first database 206.

In the environment 200 shown in FIG. 2, the second database 208 can serve as a standby database for the nodes 202 and 204. Specifically, the second database 208 can be added as a standby database in the environment 200. More specifically, the database property file associated with the nodes 202 and 204 can be updated to add the URL of the second database 208. This can be repeated on all nodes associated with the nodes 202 and 204, e.g. on a cluster-basis or in the entire environment 200. The database management system 212 can perform applicable operations related to database management in the environment 200. Specifically, the database management system 212 can perform operations related to adding the second database as a standby database in the environment 200, e.g. for nodes 202 and 204.

In updating the database property file, a snc-provision can be performed another application can be performed where the URL of the second database 208 is added as properties to the nodes 202 and 204. Specifically, the new database properties with the URL of the second database 208 can be added to the nodes 202 and 204 existing properties file, e.g. glide.db.properties, which is part of the current file system. After writing the properties to the properties file, the nodes 202 and 204 can be configured or otherwise notified to read and reload the database properties from the properties files. For example, the existing MAINT-only access application program interface (API), which instructs an application node to read a property file and refresh its properties, can be exposed to the nodes 202 and 204. As follows, the nodes 202 and 204 can read the properties file(s) and add the second database to a list of standby candidates.

The second database 208 can be in a read-write mode while serving as the standby database for the nodes 202 and 204. Accordingly, data can be replicated from the first database 206 to the second database 208. The data replication system 210 can function to control data replication from the first database 206 to the second database 208. Data can be replicated from the first database 206 to the second database 208 in response to the addition of the second database 208 as a standby database in the environment 200. Specifically, data can be replicated from the first database 206 to the second database 208 in response to the addition of the second database 208 as a standby database for the nodes 202 and 204.

In controlling replication from the first database 206 to the second database, the data replication system 210 can check on a temporal-basis, e.g. periodically, for new databases. In turn, the data replication system 210 can detect the addition of the second database 208 as a standby database and then begin the process of data replication. Specifically, the data replication system 210 can perform pre-flight, otherwise pre-replication, checks. For example, the data replication system 210 can check if the second database 208 is in a writable mode. Further, the data replication system 210 can check if the first database 206 is in a writable mode as well. Additionally, the data replication system 210 can check that the second database 208 sys_dictionary table exists. Further, the data replication system 210 can check that the instance_id for the second database 208 is the same as the primary and all the standby candidates for the nodes 202 and 204.

The nodes 202 and 204 can be associated with an intended primary database value. An intended primary database value is a configurable indicator of the primary database that an associated node should be pointing to as the primary database, e.g. the database the node should be accessing in performing operations. For example, an intended primary database value can comprise a URL value associated with a database, e.g. an intended primary database.

In the environment 200 shown in FIG. 2, the both the first database 206 and the second database 208 are in a read-write mode. This can be considered a potential split-brain scenario with respect to the nodes 202 and 204. Specifically, this is a potential split-brain scenario since the nodes 202 and 204 are configured to access both the first database 206 and the second database 208 and both databases are in a read-write mode. As a result, the second database 208 could incorrectly promote itself to become active, e.g. believing the first database 206 is inactive, even though the first database 206 is actually active. To avoid this split-brain scenario, the database management system 212 can be configured to ensure that the intended primary database value of the nodes 202 and 204 is set to the URL of the first database 206 and not the second database 208, while both the first database 206 and the second database 208 are in a read-write mode. Specifically, the database management system 212 can control and set the intended primary database value of the nodes 202 and 204 to control which database the nodes 202 and 204 point to and access as the primary database. As will be discussed in greater detail later, the database management system 212 can change the intended primary database value of the nodes 202 and 204 to change the nodes' primary database from the first database 206 to the second database 208. However, with respect to the environment 200 shown in FIG. 2, the database management system 212 can ensure that the intended primary database value of the nodes 202 and 204 is set to the URL of the first database 206 and not the second database 208 while both the first database 206 and the second database 208 are in a read-write mode.

FIG. 3 illustrates a schematic diagram of the environment 300 in which the first database 206 is switched to a read-only mode while still serving as the primary database, according to some examples of the present disclosure. In the environment 300 shown in FIG. 3, the first database 206 is switched to a read-only mode before switchover occurs from the first database 206 to the second database 208 serving as the primary database for the nodes 202 and 204. As used herein, this phase is referred to as the pre-switchover phase. The pre-switchover phase can occur once the environment 200 shown in FIG. 2 is created. Specifically, the pre-switchover phase can begin once the second database 208 is introduced in the environment 200 as a read-write standby database for the nodes 202 and 204.

During the pre-switchover phase, the data replication system 210 functions to control replication of data from the first database 206 to the second database 208. Further, the data replication system 210 can function to verify the data replication. In verifying data replication, the data replication system 210 can determine, otherwise confirm, how much data in the first database 206 has been replicated to the second database 208. Specifically, the data replication system 210 can quantify, e.g. relative to a threshold, how much of a total amount of data in the first database 206 has been replicated to the second database 208. More specifically, the data replication system can verify that a specific amount of a total amount of data in the first database 206 has been replicated to the second database 208.

In various embodiments, during the pre-switchover phase and before the first database 206 is switched to a read-only mode, the first database 206 can be placed into a quiescent mode. Specifically, the first database 206 can be placed into a quiescent mode from a read-write mode, as shown in the environment in FIG. 2. A quiescent mode, as used herein, is a mode in which transactions with a database in the mode are limited. Specifically, in the quiescent mode, once current transactions with a database are complete, then database access is limited to only specific users and specific transactions. Effectively, the quiescent mode limits the write volume to the database, as opposed to as if the database is in a read-write mode. The users and transactions that are allowed access in the quiescent mode is implementation dependent and can be varied by the database management system 212. For example, only HTTP/REST/AMB and high-priority background jobs (priority <=25 OR (type==async BR && priority <=100)) can be processed while a database is operating in the quiescent mode.

The database management system 212 can control placing the first database 206 and the second database 208 into the various modes, read-write mode, read-only mode, and quiescent mode. Specifically, the database management system 212 can place the first database 206 from a read-write mode to a quiescent mode. Further, the database management system 212 can place the first database 206 from a quiescent mode to a read-only mode.

The database management system 212 can switch the first database 206 from a quiescent mode to a read-only mode based on data replication from the first database 206 to the second database 208. Specifically, the database management system 212 can switch the first database 206 from a quiescent mode to a read-only mode based on the amount of data that is replicated to the second database 208, or otherwise the progress of the data replication. The amount of data that triggers switching from a quiescent mode to a read-only mode can comprise a configurable threshold. For example, the threshold can comprise the data replication being almost complete, e.g. by a percentage amount.

The database management system 212 can perform various functions with respect to the first database 206 after the first database is put in a read-only mode. Specifically, the database management system 212 can be configured to return that the HTTP service is unavailable to http requests. Further, the database management system 212 can pause all in-flight transactions to the first database 206, otherwise put the transaction on wat. Additionally, the database management system 212 can configure the first database 206 to process content requests and diagnostic requests. Further, while in a read-only mode, threads that do not perform database writes can continue to access the first database 206. For example, Memory WatcherThread, HTTPIdleConnectionMonitor, RowBlockCleanerThread can continue to access the first database 206.

Figure 4:
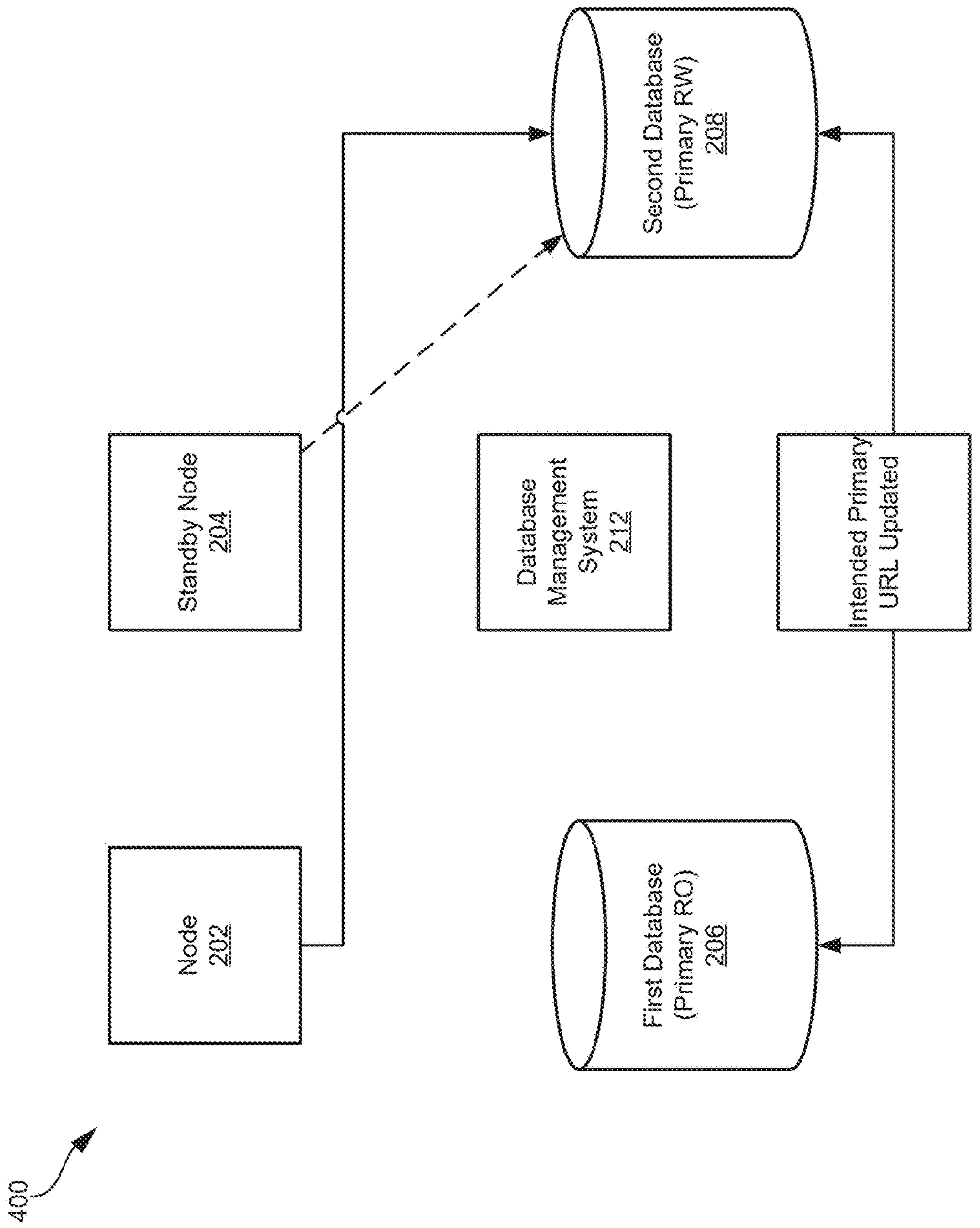
FIG. 4 illustrates a schematic diagram of the environment in which the second database 208 switches to the primary database in a read-write mode, according to some examples of the present disclosure.

FIG. 4 illustrates a schematic diagram of the environment 400 in which the second database 208 switches to the primary database in a read-write mode, according to some examples of the present disclosure. The process of switching the second database 208 to the primary database in a read-write mode is referred to herein as switchover. During switchover, the first database 206 can still be listed as a primary database for the nodes 202 and 204, however, the first database 206 can remain in a read-only mode.

The database management system 212 can function to facilitate switchover. Specifically, the database management system 212 can cause the nodes 202 and 204 to switch from the first database 206 and point to the second database 208 as the primary database. In facilitating switchover, the database management system 212 can change the intended primary database value associated with the nodes 202 and 204 from the first database 206 to the second database 208. Specifically, the database management system 212 can change the intended primary URL of the nodes 202 and 204 from the first database 206 to the second database 208. As follows, the nodes 202 and 204 can switch over to the second database 208 and begin to access or otherwise point to the second database 208 as a primary database.

The operations performed during pre-switchover and switchover can be performed without restarting the nodes 202 and 204. Specifically, the primary database of the nodes 202 and 204 can be switched from the first database 206 to the second database 208 without restarting the nodes 202 and 204. Accordingly, downtime associated with restarting the nodes 202 and 204 and any effects associated with restarting such nodes can be avoided.

The database management system 212 can function to manage post-switchover operations. Post-switchover operations can comprise applicable operations that can be performed after the nodes 202 and 204 are configured to point from the first database 206 to the second database 208 as the primary database. Specifically, the database management system 212 can perform operations in relation to removing the first database 206 as a primary database to the nodes 202 and 204, without restarting the nodes 202 and 204. For example, the database management system 212 can decommission a connection pool of the first database 206, invalidate a cache of the first database 206, cancel any inflight transactions with database interfaces of the first database 206, and unregister listeners of the first database 206. Further, the database management system 212 can perform operations in relation to making the second database 208 the primary database to the nodes 202 and 204. For example, the database management system 212 can build a connection pool for the second database 208 and register new listeners of the second database 208.

In various embodiments, the database management system 212 can facilitate a rolling restart of nodes in the environment, including the nodes 202 and 204. Specifically, the rolling restart of the nodes 202 and 204 can be performed after switchover has occurred. More specifically, the rolling restart of the nodes 202 and 204 can be performed a substantial amount of time after switchover has occurred to the second database 208 and the nodes 202 and 204 have accessed the second database 208. In performing the rolling restart of the nodes 202 and 204, information related to the first database 206 in serving as a primary database in a read-write mode can be cleared from memory, e.g. code level cache. Specifically, this can eliminate the need to do a full cache flush during switchover to the second database 208. Further, in performing the rolling restart of the nodes 202 and 204, the first database 206 can be switched to a candidate standby database for the nodes 202 and 204.

Figure 5:
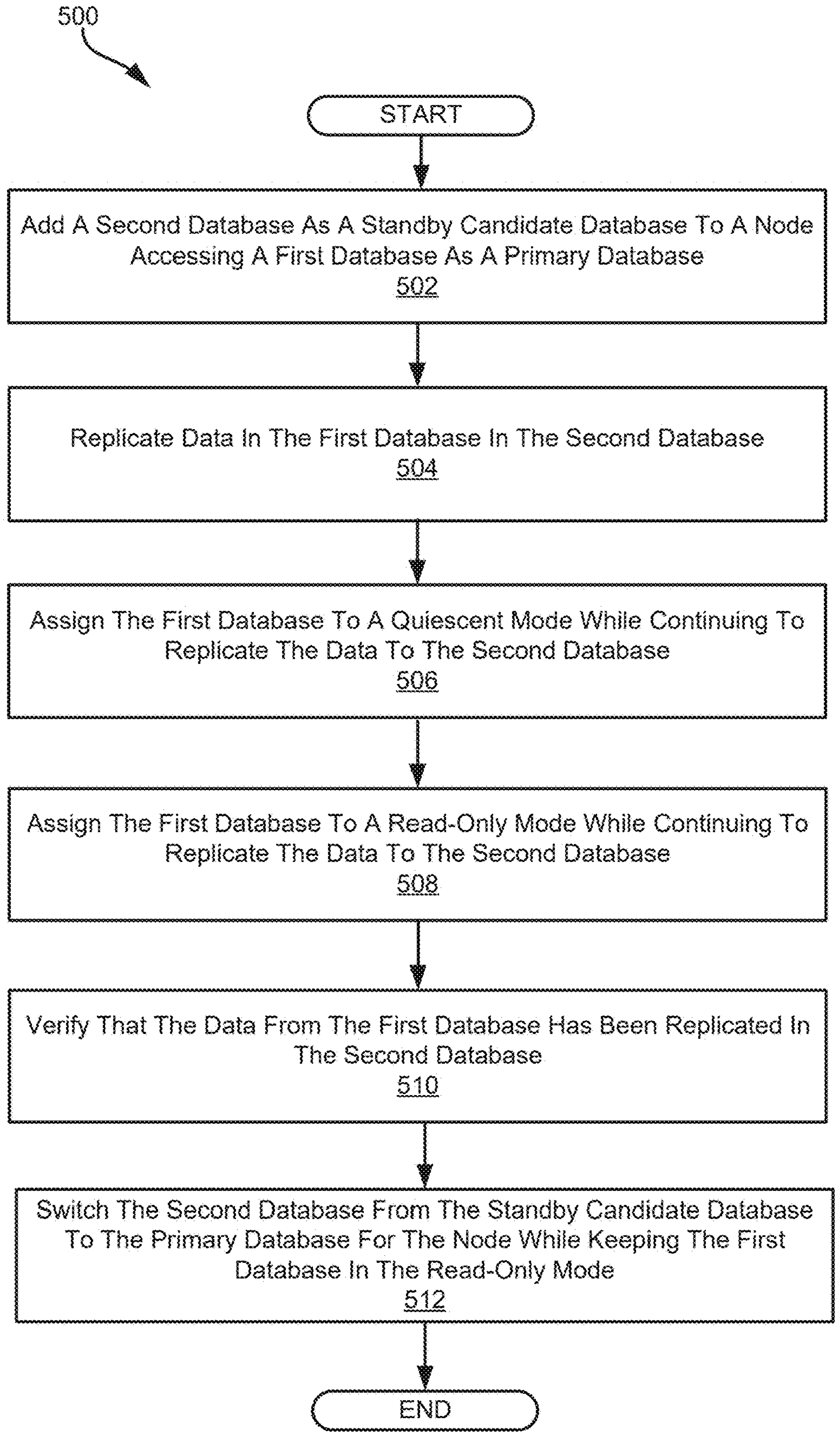
FIG. 5 illustrates a flowchart of an example method of performing a switchover of primary databases to a node without restarting the node, according to some examples of the present disclosure.

FIG. 5 illustrates a flowchart 500 of an example method of performing a switchover of primary databases to a node without restarting the node, according to some examples of the present disclosure. The method shown in FIG. 5 is provided by way of example, as there are a variety of ways to carry out the method. Additionally, while the example method is illustrated with a particular order of steps, those of ordinary skill in the art will appreciate that FIG. 5 and the modules shown therein can be executed in any order and can include fewer or more modules than illustrated. Each module shown in FIG. 5 represents one or more steps, processes, methods or routines in the method. The modules will be discussed with respect to the example architectures described herein.

At module 502, a second database is added as a standby candidate database to a node accessing a first database as a primary database. The second database can be added as a standby candidate by updating the database property file of the node. In turn, the node can be configured to read the updated property file and add the second database as a standby candidate database.

The second database can be added in a read-write mode to enable data writing to the second database. Further, the first database can be maintained in a read-write mode. While both databases are maintained in the read-write mode an intended primary database value of the node can be kept at an identifier of the first database.

At module 504, data in the first database is replicated in the second database. Specifically, data in the first database can be replicated to the second database while both the first and second databases are in a read-write mode. More specifically, data in the first database can be replicated to the second database while data is still written to the first database.

At module 506, the first database is assigned to a quiescent mode while continuing to replicate data to the second database. Assigning the first database to a quiescent mode can limit what write transactions can occur in the first database. In turn, this decreases the number of write transaction that occur to the first database while operating in the quiescent mode. Decreasing the number of write transactions to the first database through the quiescent mode is technically advantageous as it still allows for certain transactions with the first database while decreasing the amount of data that has to be replicated to the second database, as opposed to if the first database was kept in a read-write mode. In turn, this can decrease the time needed to replicate the data while also ensuring that all data can be replicated to the second database.

At module 508, the first database is assigned to a read-only mode while continuing to replicate data to the second database. While the first database is in the read-only mode the first database is still the primary database that the node points to for performing operations. Therefore, all or most in-flight transactions to the first database from the node can be paused. Switching the first database into the read-only mode is technically advantageous as it stops the writing of essentially any new data to the first database, while data replication continues with the second database. In turn, this can allow the replication to catch up with the current data in the first database, e.g. replicate all or nearly all of the data in the first database in the second database.

At module 510, it is verified that the data from the first database has been replicated in the second database. An applicable technique for verifying data replication can be used to verify that the data from the first database has been replicated to the second database. How much data in the first database has been replicated to the second database can be confirmed as part of verifying the data replication. Specifically, the amount of data that has been replicated can be quantified, e.g. relative to a threshold. More specifically, verification can comprise confirming that a suitable amount, e.g. a threshold amount, of the total amount of data in the first database has been replicated in the second database.

At module 512, the second database is switched from the standby candidate database to the primary database for the node while keeping the first database in the read-only mode. Specifically, the node can be configured to switch from pointing to the first database as the primary database to pointing to the second database as the primary database, as part of the switchover. The switchover can be performed without restarting the node. Performing the switchover without restarting the node is technically advantageous as any node downtime associated with restarting the node at switchover can be eliminated. In turn, problems associated with such node downtime and node downtime variability across the environment can be mitigated or eliminated completely.

Figure 6:
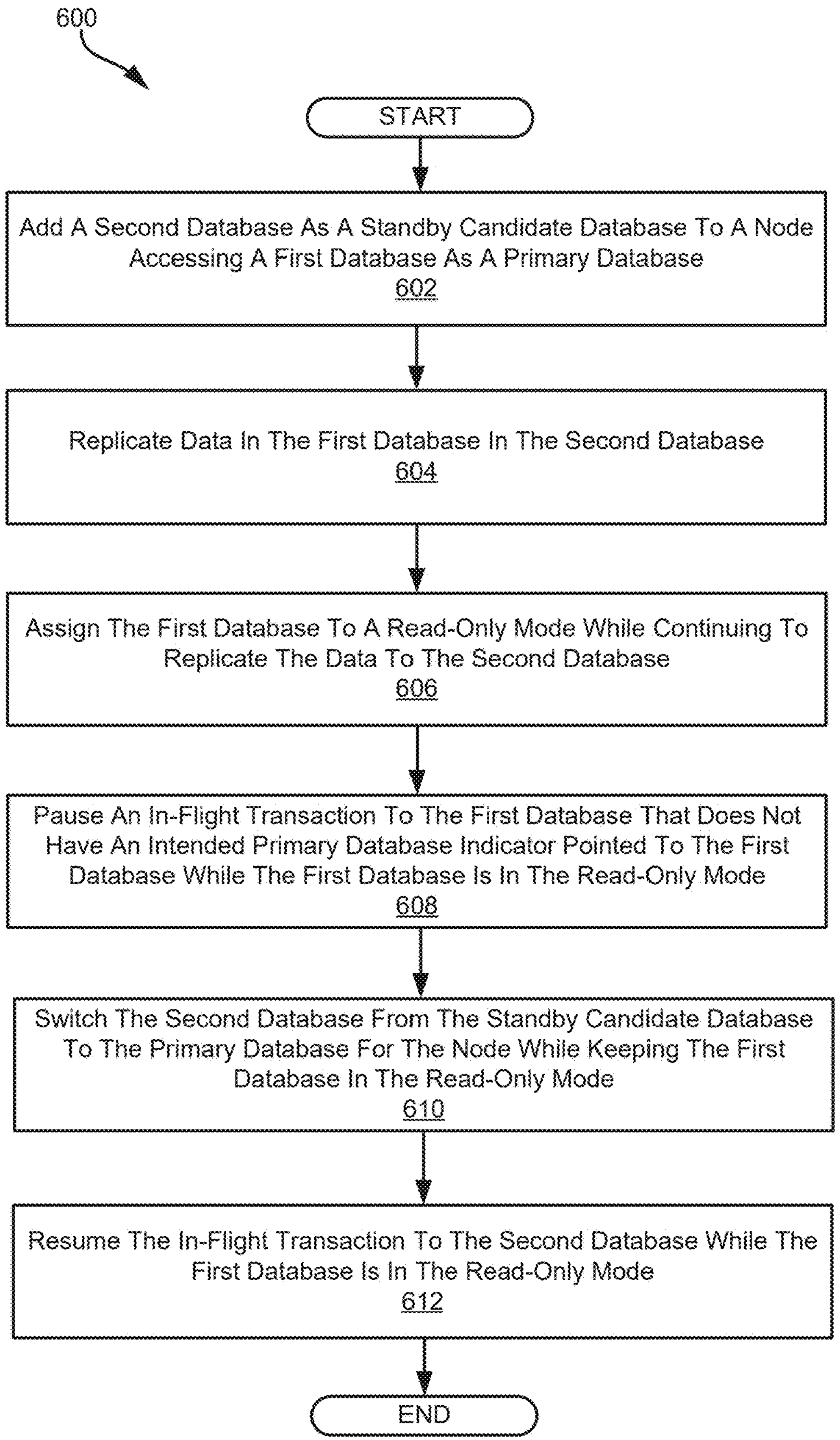
FIG. 6 illustrates a flowchart of an example method of handling in-flight transaction in performing a switchover of primary databases to a node without restarting the node, according to some examples of the present disclosure.

FIG. 6 illustrates a flowchart 600 of an example method of handling in-flight transaction in performing a switchover of primary databases to a node without restarting the node, according to some examples of the present disclosure. The method shown in FIG. 6 is provided by way of example, as there are a variety of ways to carry out the method. Additionally, while the example method is illustrated with a particular order of steps, those of ordinary skill in the art will appreciate that FIG. 6 and the modules shown therein can be executed in any order and can include fewer or more modules than illustrated. Each module shown in FIG. 6 represents one or more steps, processes, methods or routines in the method. The modules will be discussed with respect to the example architectures described herein.

At module 602, a second database is added as a standby candidate database to a node accessing a first database as a primary database. The second database can be added as a standby candidate by updating the database property file of the node. In turn, the node can be configured to read the updated property file and add the second database as a standby candidate database.

At module 604, data in the first database is replicated to the second database. Specifically, data in the first database can be replicated to the second database while both the first and second databases are in a read-write mode. More specifically, data in the first database can be replicated to the second database while data is still written to the first database.

At module 606, the first database is assigned to a read-only mode while continuing to replicate the data to the second database. In various embodiments the first database is first assigned into a quiescent mode. As follows, the first database can switch from the quiescent mode to the read-only mode while the data is replicated to the second database.

At module 608, an in-flight transaction to the first database is paused while the first database is in the read-only mode. Specifically, an in-flight transaction that does not have an intended primary database indicator pointing to the first database can be paused. An applicable system, such as the database management system 212 can pause the in-flight transaction to the first database while the first database is in the read-only mode. Specifically, the transaction can be paused in response to the first database being placed in the read-only mode. In various embodiments, in-flight transactions that have intended primary database indicators with intended primary database indicators pointing to the first database can be cancelled, e.g. by the database management system 212.

At module 610, the second database is switched from the standby candidate database to the primary database for the node while keeping the first database in the read-only mode. Specifically, the node can be configured to switch from pointing to the first database as the primary database to pointing to the second database as the primary database, as part of the switchover. The switchover can be performed without restarting the node.

At module 612, the in-flight transaction is resumed to the second database while the first database is in the read-only mode. An applicable system, such as the database management system 212, can resume the in-flight transaction. Since the in-flight transaction does not have an intended primary database indicator pointing to the first database, the in-flight transaction can be directed to the second database. Specifically, the intended primary database indicator of the transaction can be assigned as a URL of the second database, thereby directing the transaction to the second database. This is technically advantageous, as it can ensure that the in-flight transaction is directed to a database that is in a read-write mode as opposed to a database that is in a read-only mode. As follows, this can ensure that the transaction can proceed during the course of operation of the node both while the primary database of the node is switched and without restarting the node.

Figure 7:
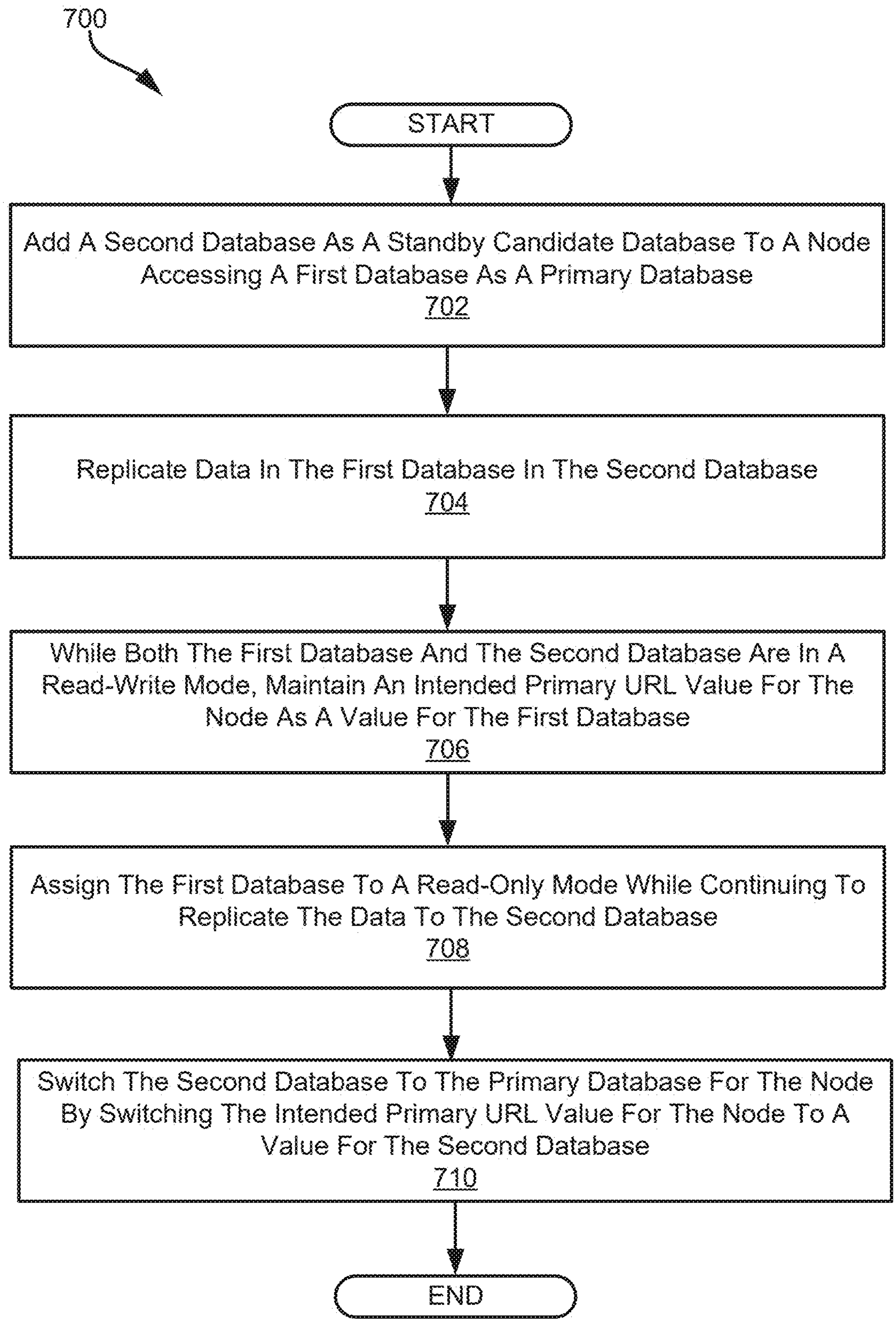
FIG. 7 illustrates a flowchart of an example method of changing an intended primary database value of a node to switch a primary database of the node, according to some examples of the present disclosure.

FIG. 7 illustrates a flowchart 700 of an example method of changing an intended primary database value of a node to switch a primary database of the node, according to some examples of the present disclosure. The method shown in FIG. 7 is provided by way of example, as there are a variety of ways to carry out the method. Additionally, while the example method is illustrated with a particular order of steps, those of ordinary skill in the art will appreciate that FIG. 7 and the modules shown therein can be executed in any order and can include fewer or more modules than illustrated. Each module shown in FIG. 7 represents one or more steps, processes, methods or routines in the method. The modules will be discussed with respect to the example architectures described herein.

At module 702, a second database is added as a standby candidate database to a node accessing a first database as a primary database. The second database can be added as a standby candidate by updating the database property file of the node. In turn, the node can be configured to read the updated property file and add the second database as a standby candidate database.

At module 704, data in the first database is replicated in the second database. Specifically, data in the first database can be replicated to the second database while both the first and second databases are in a read-write mode. More specifically, data in the first database can be replicated to the second database while data is still written to the first database.

At module 706, an intended primary URL for the node is maintained at a value for the first database while both the first database and the second database are in a read-write mode. Specifically, a URL of the first database can be maintained as the intended primary database value of the node. This ensures that the node continues to point to the first database for transactions, e.g. write transactions, even though there are two databases that are both accessible by the node and in a read-write mode. Ensuring that the node continues to point to the first database while both the first and second databases are in a read-write mode is technically advantageous as it can avoid a potential split-brain scenario. For example, ensuring that the node continue to point to the first database is technically advantageous as a split-brain scenario can be avoided in the event that the second database incorrectly promotes itself and becomes active.

At module 708, the first database is assigned to a read-only mode while continuing to replicate the data to the second database. In various embodiments the first database is first assigned into a quiescent mode. As follows, the first database can switch from the quiescent mode to the read-only mode while the data is replicated to the second database.

At module 710, the second database is switched to the primary database for the node by switching the intended primary URL value for the node to a value for the second database. The intended primary URL value for the node can be switched without restarting the node. Switching the intended primary URL value for the node to the second database without restarting the node is technically advantageous as any downtime associated with restarting the node during the switchover can be avoided. Accordingly, any problems caused by such downtime or any downtime variability across nodes can be mitigated or eliminated. In various embodiments, the node can be restarted at a later time.

Figure 8:
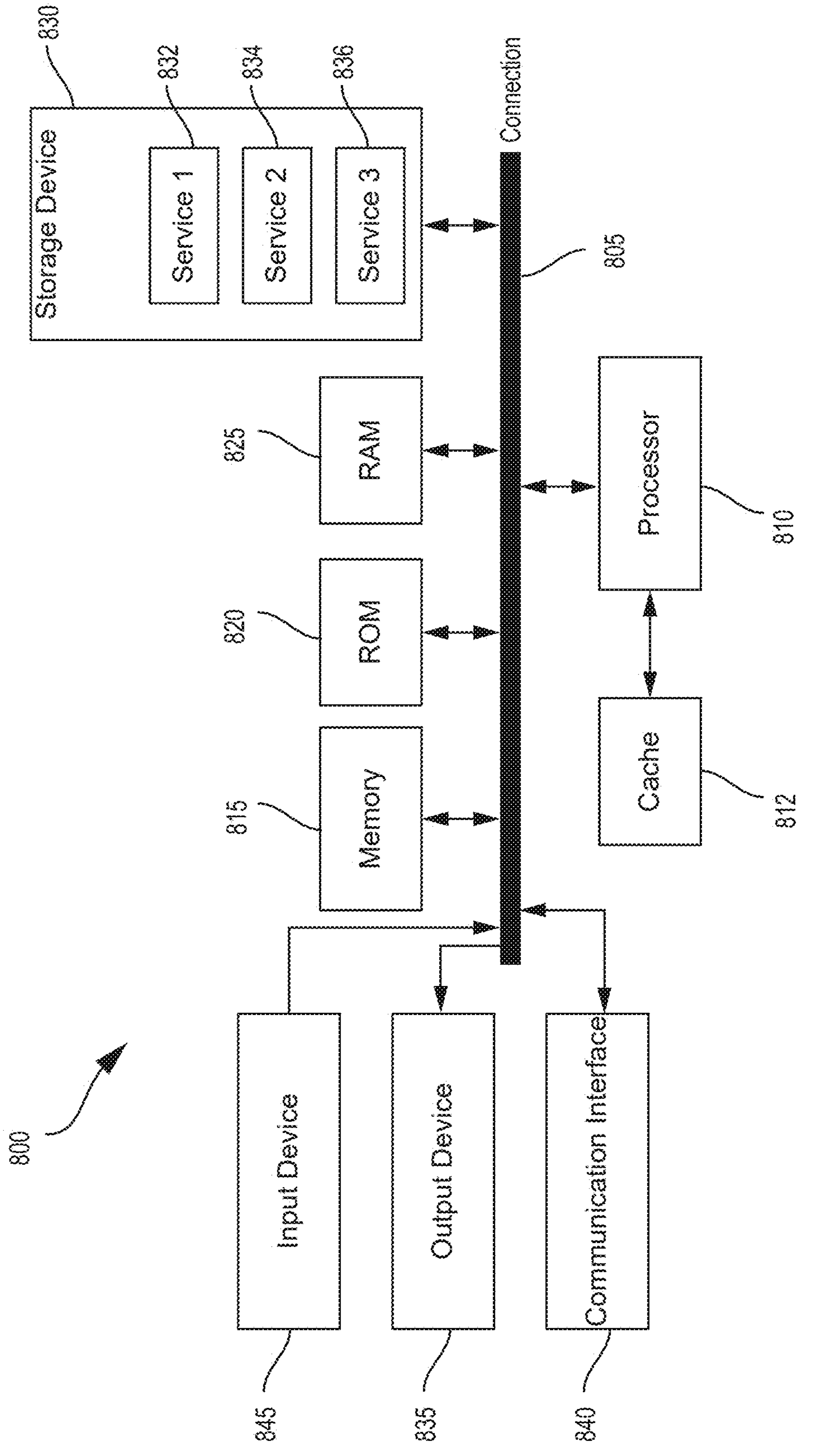
FIG. 8 illustrates an example processor-based system with which some embodiments of the subject technology can be implemented, according to some examples of the present disclosure.

FIG. 8 illustrates an example processor-based system with which some embodiments of the subject technology can be implemented. For example, processor-based system 800 can be any computing device making up, or any component thereof in which the components of the system are in communication with each other using connection 805. Connection 805 can be a physical connection via a bus, or a direct connection into processor 810, such as in a chipset architecture. Connection 805 can also be a virtual connection, networked connection, or logical connection.

In some embodiments, computing system 800 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 800 includes at least one processing unit (Central Processing Unit (CPU) or processor) 810 and connection 805 that couples various system components including system memory 815, such as Read-Only Memory (ROM) 820 and Random-Access Memory (RAM) 825 to processor 810. Computing system 800 can include a cache of high-speed memory 812 connected directly with, in close proximity to, or integrated as part of processor 810.

Processor 810 can include any general-purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art. In some instances, multimodal systems can enable a user to provide multiple types of input/output to communicate with computing system 800. Computing system 800 can include communications interface 840, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 840 may also include one or more Global Navigation Satellite System (GNSS) receivers or transceivers that are used to determine a location of the computing system 800 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 830 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read-only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Atatic RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 830 can include software services, servers, services, etc., that when the code that defines such software is executed by the processor 810, it causes the system 800 to perform a function. In some embodiments, a hardware service that performs a particular function can include the software component stored in a computer-readable medium in connection with the necessary hardware components, such as processor 810, connection 805, output device 835, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Selected Examples

Illustrative examples of the disclosure include:

Embodiment 1. A computer-implemented method comprising: adding a second database as a standby candidate database to a node accessing a first database as a primary database; replicating data in the first database in the second database; assigning the first database to a read-only mode; verifying that the data from the first database has been replicated in the second database; and switching the second database from the standby candidate database to the primary database for the node while keeping the first database in the read-only mode in response to the verification.

Embodiment 2. The computer-implemented method of Embodiment 1, further comprising: assigning the first database to a quiescent mode before assigning the first database to the read-only mode; and continuing to replicate the data in the first database to the second database while the first database is in the quiescent mode.

Embodiment 3. The computer-implemented method of either of Embodiment 1 or 2, wherein switching the second database from the standby candidate database to the primary database for the node further comprises switching an intended primary database value associated with the node from a uniform resource locator (URL) of the first database to a URL of the second database.

Embodiment 4. The computer-implemented method of Embodiment 3, further comprising: switching the intended primary database value at the first database from the URL of the first database to the URL of the second database; and switching the intended primary database value at the second database from the URL of the first database to the URL of the second database.

Embodiment 5. The computer-implemented method of either of Embodiments 3 or 4, wherein before switching the intended primary database value associated with the node from the URL of the first database to a URL of the second database and before the first database is assigned to the read-only mode, both the first database and the second database are simultaneously in a read-write mode.

Embodiment 6. The computer-implemented method of any of Embodiments 1 through 5, further comprising: pausing an in-flight transaction to the first database while the first database is in the read-only mode; and resuming the in-flight transaction at the second database after the second database is switched to the primary database for the node.

Embodiment 7. The computer-implemented method of Embodiment 6, further comprising canceling the in-flight transaction that is paused at the first database after the second database is switched to the primary database for the node.

Embodiment 8. The computer-implemented method of any of Embodiments 1 through 7, further comprising after switching the second database to the primary database: decommissioning a connection pool of the first database; invalidating a cache of the first database; cancelling any inflight transactions with database interfaces of the first database; and unregistering listeners of the first database.

Embodiment 9. The computer-implemented method of any of Embodiments 1 through 8, further comprising after switching the second database to the primary database: building a connection pool for the second database; and registering new listeners of the second database.

Embodiment 10. The computer-implemented method of any of Embodiments 1 through 9, further comprising restarting the node after switching the second database to the primary database.

Embodiment 11. The computer-implemented method of any of Embodiments 1 through 10, further comprising refraining from restarting the node while switching the second database from the standby candidate database to the primary database to switchover the node from accessing the first database to the second database without restarting.

Embodiment 12. A system comprising: one or more processors; and at least one computer-readable storage medium having stored therein instructions which, when executed by the one or more processors, cause the one or more processors to: add a second database as a standby candidate database to a node accessing a first database as a primary database; replicate data in the first database in the second database; assign the first database to a read-only mode; verifying that the data from the first database has been replicated in the second database; and switch the second database from the standby candidate database to the primary database for the node while keeping the first database in the read-only mode in response to the verification.

Embodiment 13. The system of Embodiment 12, wherein the instructions further cause the one or more processors to: assign the first database to a quiescent mode before assigning the first database to the read-only mode; and continue to replicate the data in the first database to the second database while the first database is in the quiescent mode.

Embodiment 14. The system of either of Embodiments 12 or 13, wherein switching the second database from the standby candidate database to the primary database for the node further comprises switching an intended primary database value associated with the node from a uniform resource locator (URL) of the first database to a URL of the second database.

Embodiment 15. The system of any of Embodiments 12 through 14, wherein the instructions further cause the one or more processors to: pause an in-flight transaction to the first database while the first database is in the read-only mode; and resume the in-flight transaction at the second database after the second database is switched to the primary database for the node.

Embodiment 16. The system of Embodiment 15, wherein the instructions further cause the one or more processors to cancel the in-flight transaction that is paused at the first database after the second database is switched to the primary database for the node.

Embodiment 17. The system of any of Embodiments 12 through 16, wherein the instructions further cause the one or more processors to restart the node after switching the second database to the primary database.

Embodiment 18. The system of any of Embodiments 12 through 17, wherein the instructions further cause the one or more processors to refrain from restarting the node while switching the second database from the standby candidate database to the primary database to switchover the node from accessing the first database to the second database without restarting.

Embodiment 19. The system of any of Embodiments 12 through 18, wherein the instruction further cause the one or more processors to after switching the second database to the primary database: build a connection pool for the second database; and register new listeners of the second database.

Embodiment 20. A non-transitory computer-readable storage medium storing instructions for causing one or more processors to: add a second database as a standby candidate database to a node accessing a first database as a primary database; replicate data in the first database in the second database; assign the first database to a read-only mode; verify that the data from the first database has been replicated in the second database; and switch the second database from the standby candidate database to the primary database for the node while keeping the first database in the read-only mode in response to the verification.

Embodiment 21. A system comprising means for performing a method according to any of Embodiments 1 through 11.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A computer-implemented method comprising:

while a node initially accessing a first database is continuously operating, switching the node to accessing a second database by:

adding the second database as a standby candidate database to the node initially accessing the first database as a primary database;

replicating data in the first database in the second database;

assigning the first database to a read-only mode;

verifying that the data from the first database has been replicated in the second database; and switching the second database from the standby candidate database to the primary database for the node while keeping the first database in the read-only mode in response to the verification.

2. The computer-implemented method of claim 1, further comprising:

assigning the first database to a quiescent mode before assigning the first database to the read-only mode; and continuing to replicate the data in the first database to the second database while the first database is in the quiescent mode.

3. The computer-implemented method of claim 1, wherein switching the second database from the standby candidate database to the primary database for the node further comprises switching an intended primary database value associated with the node from a uniform resource locator (URL) of the first database to a URL of the second database.

4. The computer-implemented method of claim 3, further comprising:

switching an intended primary database value at the first database from the URL of the first database to the URL of the second database; and switching an intended primary database value at the second database from the URL of the first database to the URL of the second database.

5. The computer-implemented method of claim 3, wherein before switching the intended primary database value associated with the node from the URL of the first database to a URL of the second database and before the first database is assigned to the read-only mode, both the first database and the second database are simultaneously in a read-write mode.

6. The computer-implemented method of claim 1, further comprising:

pausing an in-flight transaction to the first database while the first database is in the read-only mode; and resuming the in-flight transaction at the second database after the second database is switched to the primary database for the node.

7. The computer-implemented method of claim 6, further comprising canceling the in-flight transaction that is paused at the first database after the second database is switched to the primary database for the node.

8. The computer-implemented method of claim 1, further comprising after switching the second database to the primary database:

decommissioning a connection pool of the first database;

invalidating a cache of the first database;

cancelling any inflight transactions with database interfaces of the first database; and unregistering listeners of the first database.

9. The computer-implemented method of claim 1, further comprising after switching the second database to the primary database:

building a connection pool for the second database; and registering new listeners of the second database.

10. The computer-implemented method of claim 1, further comprising restarting the node after switching the second database to the primary database.

11. The computer-implemented method of claim 1, further comprising refraining from restarting the node while switching the second database from the standby candidate database to the primary database to switch over the node from accessing the first database to the second database.

12. A system comprising:

one or more processors; and at least one computer-readable storage medium having stored therein instructions which, when executed by the one or more processors, cause the one or more processors to:

while a node initially accessing a first database is continuously operating, switch the node to access a second database by:

adding the second database as a standby candidate database to the node initially accessing the first database as a primary database;

replicating data in the first database in the second database;

assigning the first database to a read-only mode;

verifying that the data from the first database has been replicated in the second database; and switching the second database from the standby candidate database to the primary database for the node while keeping the first database in the read-only mode in response to the verification.

13. The system of claim 12, wherein the instructions further cause the one or more processors to:

assign the first database to a quiescent mode before assigning the first database to the read-only mode; and continue to replicate the data in the first database to the second database while the first database is in the quiescent mode.

14. The system of claim 12, wherein switching the second database from the standby candidate database to the primary database for the node further comprises switching an intended primary database value associated with the node from a uniform resource locator (URL) of the first database to a URL of the second database.

15. The system of claim 12, wherein the instructions further cause the one or more processors to:

pause an in-flight transaction to the first database while the first database is in the read-only mode; and resume the in-flight transaction at the second database after the second database is switched to the primary database for the node.

16. The system of claim 15, wherein the instructions further cause the one or more processors to cancel the in-flight transaction that is paused at the first database after the second database is switched to the primary database for the node.

17. The system of claim 12, wherein the instructions further cause the one or more processors to restart the node after switching the second database to the primary database.

18. The system of claim 12, wherein the instructions further cause the one or more processors to refrain from restarting the node while switching the second database from the standby candidate database to the primary database to switch over the node from accessing the first database to the second database.

19. The system of claim 12, wherein the instruction further cause the one or more processors to after switching the second database to the primary database:

build a connection pool for the second database; and register new listeners of the second database.

20. A non-transitory computer-readable storage medium storing instructions for causing one or more processors to:

while a node initially accessing a first database is continuously operating, switch the node to access a second database by:

adding the second database as a standby candidate database to the node accessing the first database as a primary database;

replicating data in the first database in the second database;

assigning the first database to a read-only mode;

verifying that the data from the first database has been replicated in the second database; and switching the second database from the standby candidate database to the primary database for the node while keeping the first database in the read-only mode in response to the verification.

* * * * *